United States Patent
Singh

(10) Patent No.: US 11,874,797 B1
(45) Date of Patent: Jan. 16, 2024

(54) SMART PRIVILEGE ESCALATION IN A CLOUD PLATFORM

(71) Applicant: Salesforce, Inc., San Francisco, CA (US)

(72) Inventor: Manish Singh, Telangana (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/847,826

(22) Filed: Jun. 23, 2022

(51) Int. Cl.
*G06F 16/00* (2019.01)
*G06F 16/16* (2019.01)
*G06F 21/62* (2013.01)
*G06F 16/2455* (2019.01)

(52) U.S. Cl.
CPC ...... *G06F 16/162* (2019.01); *G06F 16/24557* (2019.01); *G06F 21/6218* (2013.01)

(58) Field of Classification Search
CPC .................................................. G06F 16/24557
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |

(Continued)

*Primary Examiner* — Ajith Jacob
(74) *Attorney, Agent, or Firm* — Kwan & Olynick LLP

(57) ABSTRACT

Privilege escalation in a cloud platform comprises provisioning to a client access privileges to the database entities that are covered by a license. A base escalation matrix is provisioned to the client with additional access privileges not covered by the license. An API request is received and the requested CRUD operation is attempted on a first database entity. Responsive to the requested CRUD operation initially failing because the client does not have required access privileges activation of an exception signaling failure of the requested CRUD operation is detected and used as a trigger to fetch the base escalation matrix. The access privileges of the client are escalated by applying the additional access privileges from the base escalation matrix to a user context of the current API query request, and repeating the requested CRUD operation. The escalated access privileges are then removed.

25 Claims, 6 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

(56) References Cited

U.S. PATENT DOCUMENTS

2013/0247216 A1    9/2013   Cinarkaya  
2014/0359537 A1   12/2014   Jackobson et al.  
2017/0124193 A1*   5/2017   Li ........................ G06F 16/951

* cited by examiner

|  | 216 | 218 | 220 | 222 | | | |
|---|---|---|---|---|---|---|---|
|  | Client ID | API ID | DB Entity ID | Create | Read | Update | Delete |
| 2 to 14 | Client ID1 | API1 | Quote | True | True | False | False |
|  | Client ID2 | API1 | Order | False | True | False | False |
|  | Client ID3 | API2 | Contact | False | True | False | False |

126B

Escalation Matrix Tool 300

API ID — API1 — 218

DB Entity ID — Quote — 206

CRUD Operations:
- ☒ Create
- ☒ Read
- ☐ Update
- ☐ Delete

— 208

Save  Update  Delete

SMART PRIVILEGE ESCALATION IN A CLOUD PLATFORM

TECHNICAL FIELD

One or more implementations relate to the field of privilege escalation; and more specifically, to smart privilege escalation in a cloud platform.

BACKGROUND ART

Most computer systems are designed for use with multiple user accounts, each of which is provided with a set of access rights known as privileges. Common privileges include performing create, read, update and delete (CRUD) operations on resources, e.g., records or files, of a computing system. Cloud platforms, such as a SAAS platform, utilize multilayered/stacked applications to allow users to access records through types of devices and applications, e.g., browser-based, OS, and mobile clients. When access to a record is attempted, sometimes the system needs to access related records in internal layers of the platform for which the user does not have access.

For these internal record access, cloud platforms typically invoke a vertical privilege escalation. Privilege escalation is a configuration within an operating system or software application that provides elevated access to resources that are typically protected from a user or an application, meaning the application receives privileges to which they are not typically entitled.

The problem is that current privilege escalation solutions are not very fine grained and lack the idea of least privilege. The least privilege says that a request being served under a context should have the minimum level of privileges needed to perform a task and scoped to a minimum level of context, not more and not less. The current privilege escalation solutions elevate the privileges broadly, meaning they elevate the privileges for all the records, rather than keeping to the idea of least privilege. This could bring security breaches in the cloud platform.

In addition, the privilege escalation is performed by code in a service layer of the cloud platform and sometimes needs to be changed or updated. Updating the privilege escalation code requires a server redeployment which may result in down time, and the code update may be error prone—both of which results in a high turnaround time.

What is needed, therefore, is an improved privilege escalation system in a cloud platform.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for a smart privilege escalation in a cloud platform. The cloud platform first provisions a client with client access privileges during onboarding as part of a license. Any client privileges that need to be escalated are stored in a base escalation matrix in association with a database entity and an API that will be used to query the database entity. When a change in business logic requires new access privileges subsequent to creation of the base escalation matrix, the cloud platform creates an extended escalation matrix with additional access privileges. A user interface is also provided to enable an operator of the cloud platform to make entries of database entities versus client access privileges in the escalation matrix. In response to an API request that fails because client access privileges are insufficient, an exception is thrown. A smart escalation service detects the thrown exception and forms a union between the base escalation matrix and the extended escalation matrix. The smart escalation service then escalates the privilege by applying the access privileges from the escalation matrix to the user context corresponding to the API request.

Figure 1:
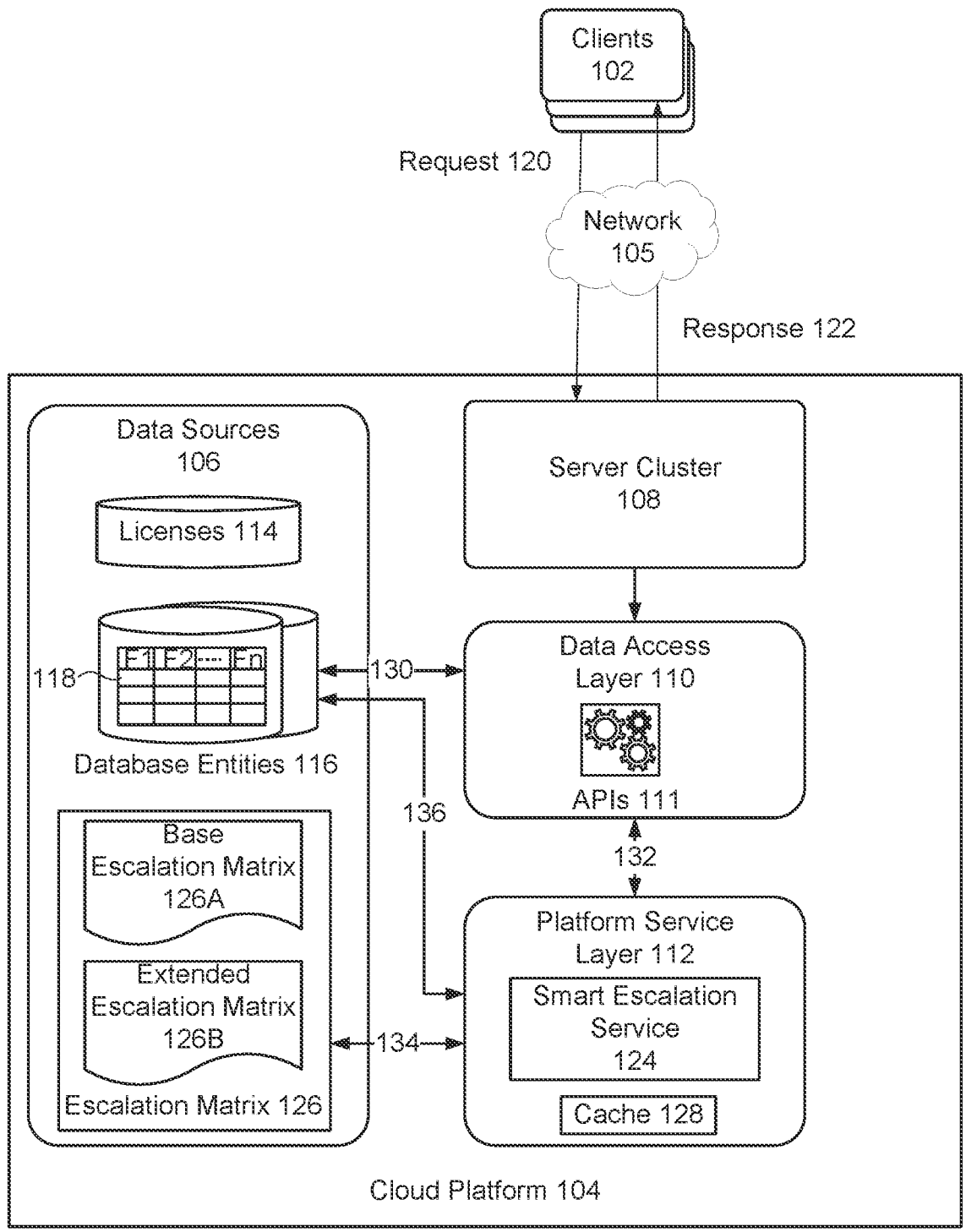
FIG. 1 illustrates a smart privilege escalation system in accordance with the disclosed embodiments.

FIG. 1 illustrates a smart privilege escalation system in accordance with the disclosed embodiments. The smart privilege escalation system 100 may include a plurality of clients 102 in network communication with a cloud platform 104. The clients 102 may access software and compute services (e.g., databases, storage, analytics, networking, software and intelligence) provided by the cloud platform 104 using client devices (not shown) that are in communication over network 105 (e.g., the Internet) with a server cluster 108. As used herein, the term client may represent a client organization, individual users of a client organization, and/or applications that the client may use to access data to/from the cloud platform 104. The phrase server cluster represents a group of server computers working simultaneously. Clustered servers may ensures higher availability, load balancing, and system scalability of the cloud platform 104.

In implementations, the cloud platform 104 may comprise a software-as-a-service (SAAS), a platform-as-a-service (PAAS), or an infrastructure-as-a-service (IAAS). In one implementation, the cloud platform 104 may be implemented as a single-tenant or a multi-tenant cloud architecture. A single-tenant cloud architecture is one where a single software instance and its supporting infrastructure/database serve only one client or customer, and all customer data and interactions are separate from every other customer. A multi-tenant architecture allows the customers to share computing resources where each client or customer (also called tenants) has an independent instance operating in a shared environment. An example of a multi-tenant architecture is an implementation where the cloud platform 104 is a customer relationship management (CRM) service.

In addition to the server cluster 108, the cloud platform 104 may further include data sources 106, a data access layer 110, and a platform service layer 112. The data sources 106 represent sources of data and may include stored licenses 114 of the clients 102, database entities 116, and data stored as files or even live feed data (not shown). The database entities 116 (e.g., databases, data lakes, data warehouse, etc.) comprise records 118 that may include column/fields (e.g., F1, F2 . . . Fn) and rows/data objects that store the data. In the example shown, the data sources 106 are shown stored local to the cloud platform 104, but at least a portion of the data sources 106 may be stored external to the cloud platform 104 and accessed through the public Internet or a dedicated private network connection.

The data access layer 110 may be responsible for retrieving data from the database sources 106, while the platform service layer 112 may be responsible for fulfilling tasks internal to the cloud platform. The data access layer 110 or another component of the cloud platform 104 includes application programming interfaces (APIs) 111, and a runtime for fulfilling client queries with existing data from the database entities 116. The APIs 111 connect to various database entities 116 and provide an API endpoint for a client 102 to receive requested data in via an API call. The server cluster 108 accepts API query requests 120 (also referred to as requests 120) from the clients 102, aggregates the various services required to fulfill the queries using the data sources 106, and returns a response 122 to the requesting client 102.

At client onboarding, the clients 102 execute a license with the cloud platform 104, and access rights or privileges assigned to the clients 102 by the cloud platform 104 are typically driven by the terms of the corresponding licenses 114. Thus, the license 114 determines which database entities 116 and records 118 a particular client 102 can access via the APIs 111.

Privilege escalation is a frequently required feature in a cloud platform comprising a system of records 118. In a system of records, there are master database entities, and there are related database entities having identifiers (IDs) that are associated with in the master database entities. Database entity IDs may identify a database table, a database record, or both. Client permissions controlled by the license 114 typically map to database entity IDs passed as input parameters to the APIs 111 that identify the database entities 116 the client 102 is attempting to access.

When a particular client 102 attempts to create a record in a master database entity, or attempts to perform a CRUD (Create, Delete. Update Delete) operation on a record of the master database entity, the operation may also require an internal service of the cloud platform to access a related database entity for which the client 102 does not have sufficient permission. For example, if the API request 120 contains entity IDs "ID1, ID2 and ID3", then the license provisioned to the customer will ideally have required access to database entities "ID1, ID2 and ID3". But internally, one or more of the APIs 111 might need extra privileges to related database entity IDs associated with internal layers of the cloud platform 104 and that are not be part of the input API request 120 and for which the client 102 does not have sufficient permission. For these internal record access, the cloud platform 104 needs to escalate the privilege of the client 102. This is typically done by granting the client 102 temporary access to the related database entities, otherwise loading or creation of the master database entity records will fail.

Current privilege escalation solutions are not very fine grained and fail to adhere to the idea of least privilege. The least privilege idea is that a request being served under a context should have the minimum level of privileges needed to perform a task and scoped to a minimum level of context, not more and not less. The traditional privilege escalation solutions elevate the privileges too broadly by elevating the privileges for all the records, not the minimum number. This could result in security breaches in the cloud platform. In addition, privilege escalation is typically performed by code in the platform service layer 112 of the cloud platform 104, which sometimes needs to be changed or updated. The need to write and update the privilege escalation code typically results in errors, and also requires a restart of servers, which introduces downtime to the cloud platform.

According to the disclosed embodiments, a smart privilege escalation service 124 is provided, which when executed by the server cluster 108, performs privilege escalation based on use of an escalation matrix 126 that stores privileges that need to be escalated by the cloud platform 104, rather than hardcoding the privileges that need to escalated. The smart escalation service 124 responds to failed data accesses by the APIs 111 due to insufficient access privileges by accessing the escalation matrix 126 and escalate the access privilege to one or more database entities 116 or records 118 as defined in the escalation matrix 126. The privileges that need to be escalated are typically associated with database entities 116 or records 118 that are not covered by the client's license and are not be part of the input API request 120. Typically the privileges to be escalated are fore database entities related to the database entities reference in the API request that are used internally by layers of the cloud platform 104, such as by the platform service layer 112. The escalation matrix 126 is created, controlled, and stored by the cloud platform 104, and access to the escalation matrix 126 may be limited to a few roles, if any, of the client 102.

In one implementation, the smart escalation service 124 is shown as part of the platform service layer 112. However, the smart escalation service 124 is executed by the server cluster 108 along with other code and may reside anywhere in the cloud platform 104.

According to one implementation, the escalation matrix 126 may comprise a base escalation matrix 126A and an extended escalation matrix 126B that define additional client access privileges that are not covered by the client's license. The escalation matrix 126 is accessed by the smart escalation service 124 to perform privilege escalation in response to the API query requests 120, rather than requiring the cloud platform provider to write code to do so. The base escalation matrix 126A may be provisioned at client 102 onboarding by an operator of the cloud platform 104 along with the privileges granted as part of the client's license 114. The extended escalation matrix 126B may be used or created when a change in business logic may require new access privileges subsequent to creation of the base escalation matrix 126A.

Figure 2A:
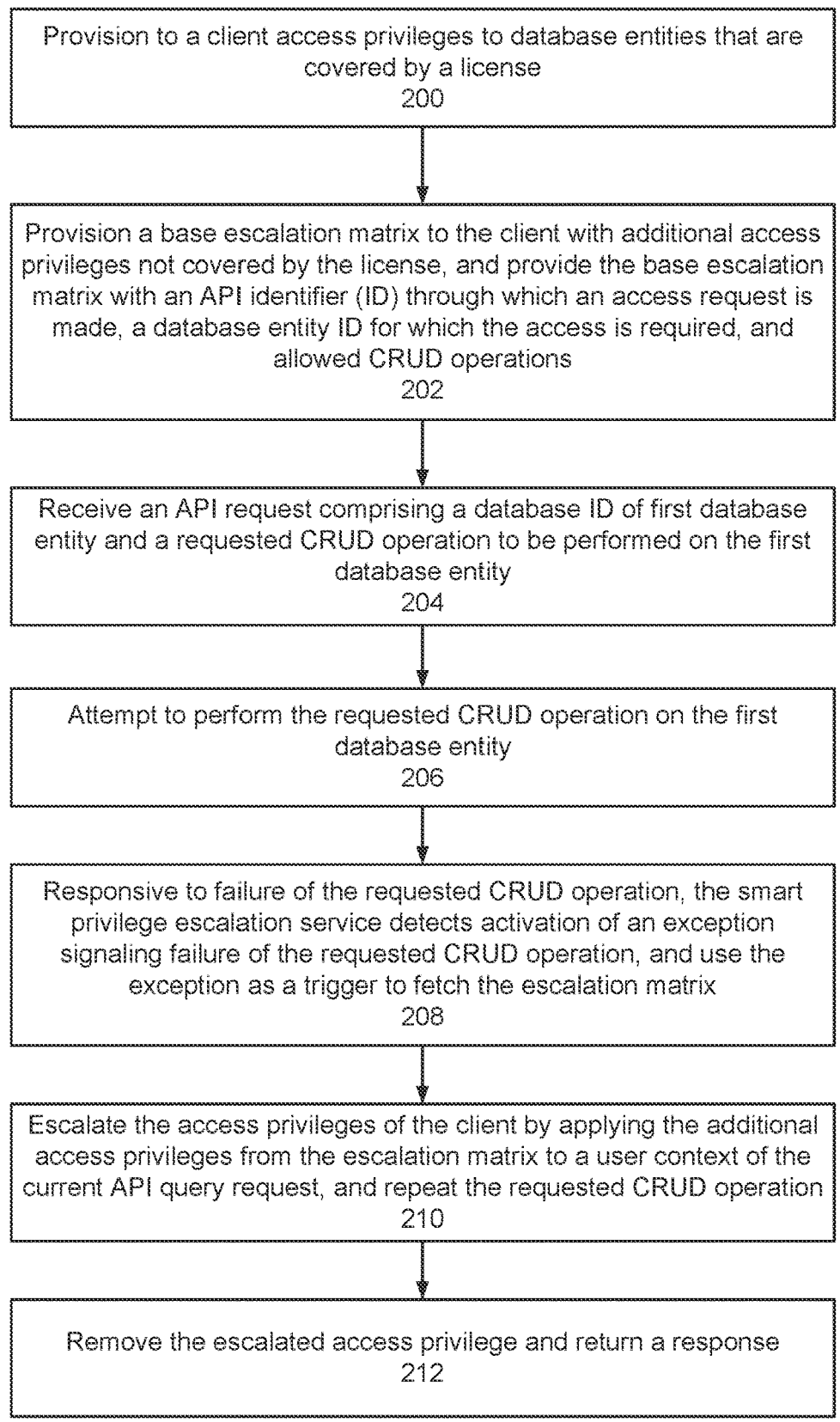
FIG. 2A is a flow diagram illustrating a process for implementing smart privilege escalation in the cloud platform according to the disclosed embodiments.

FIG. 2A is a flow diagram illustrating a process for implementing smart privilege escalation in the cloud platform according to the disclosed embodiments. As described above, the cloud platform 104 includes records 118 residing in one or more database entities 116, and exposes one or more APIs 111 as a payload for clients 102 to perform CRUD (Create, Delete, Update, Delete) operations on the database entities 116. At least a portion of the process is performed by the smart privilege escalation service when executed by the server cluster 108.

The process may begin by the cloud platform 104 provisioning to the client access privileges that are covered by a license (block 200). The license may be between the client and the cloud platform for the client to access services provided by the cloud platform 104.

A base escalation matrix is also provisioned to the client with additional access privileges not covered by the license, and the base escalation matrix may be provided with one or more entries, each comprising an API identifier (ID) through which an access request is made, a database entity ID for which access is required, and allowed CRUD operations (block 202). The provisioning process may be done during client onboarding. In one implementation, the additional access privileges are to one or more of the database entities that are accessed internally by the cloud platform and to which the client does not have access privileges. For example, the base escalation matrix 126A may grant the client with access privileges required to access database entities related to master database entities that referenced in the API request.

Figures 2B, 2C, 3:
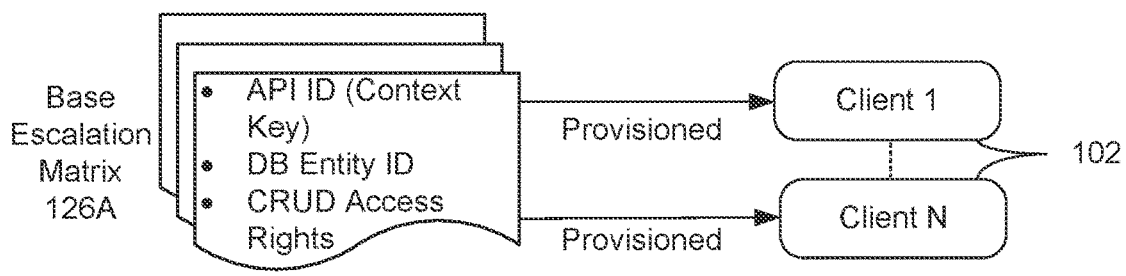
FIG. 2B is a diagram illustrating the provisioning of base escalation matrices to the clients.
FIG. 2C illustrates an example data structure of the extended escalation matrix.
FIG. 3 illustrates an example UI of an escalation matrix tool displayed by the server cluster for creating and modifying the extended escalation matrix.

FIG. 2B is a diagram illustrating the provisioning of base escalation matrices 126A to the clients. In one implementation, the cloud platform 104 may create a base escalation matrix 126 for each of the APIs 111 that can be invoked by the clients 102. The example of FIG. 2B shows respective base escalation matrices 126A for different APIs 111, each provisioned to one or more of the clients 102. In one implementation, each of the base escalation matrices 126A may include a database entity ID and associated access CRUD privileges that will need to be escalated. The base escalation matrix 126A may further include an API ID (also referred to as an API context key) that identifies the respective API 111. Although not shown, in another implementation, the base escalation matrix 126A may be associated with one or more the clients 102 through respective client IDs (not shown).

In an another implementation, rather than base escalation matrix 126 for each API 111, there could be a single base escalation matrix 126 for all the APIs 111 that includes a series of records each having an API ID, a database entity ID and associated CRUD access privileges, and a client ID.

In a further aspect of the disclosed embodiments, the base escalation matrices 126A may be stored as files within the data sources 106. For example, the base escalation matrices 126A may be stored as extensible markup language (XML) files (e.g., esm.xml).

Referring again to FIGS. 1 and 2A, in operation, the server cluster 108 receives an API request 120 comprising a database ID of a first database entity, and a requested CRUD operation to be performed on the first database entity (block 204). The request 1220 may further comprise a record ID of a record stored in the first database entity and fields and values that are to be retrieved from or stored in the corresponding record. An API query request is typically made using a client/user credential. When a user logs in to the CRM Platform, an object called a user context is created in the cloud platform 104 corresponding to the user credential that signifies the context of the current user under whose credential the API call is made. The user context contains information about the calling user, and also information about what access privileges the user has.

The server cluster 108 then attempts to perform the requested CRUD operation 130 (FIG. 1) on the first database entity (block 206). Responsive to the requested CRUD operation 130 initially failing because the client does not have access privileges, control passes to the smart privilege escalation service 124 via line 132. The operation, may fail because access to the first database entity may require internal access to a related database entity for which the client does not have access rights. The smart privilege escalation service 124 then detects activation of an exception signaling failure of the requested CRUD operation, and uses the exception as a trigger to fetch the escalation matrix at via line 134 (block 208).

The smart privilege escalation service 124 escalates the access privileges of the client by applying the additional access privileges from the escalation matrix to a user context of the current API query request, including the requested CRUD operation, and repeats the requested CRUD operation via line 136 (block 210). The escalated access privilege is then removed and the response 122 is returned (block 212). In one implementation the escalated access privilege may be removed as soon as the CRUD operation completes.

Referring again to FIG. 1, in accordance with a further aspect of the disclosed implementations, if business logic of any of the APIs 111 changes that results in a new requirement for internal access of the cloud platform 104 after deployment of the smart escalation service 124, the operator of the cloud platform 104 may create or update the extended escalation matrix 126B to add the new internal access.

FIG. 2C illustrates an example data structure of the extended escalation matrix 126B. In one implementation, the extended escalation matrix 126B may comprise a set of tuples 214 each including a client ID 216, the API ID 218, the database entity ID. 20 and the CRUD rights 222 that need to be escalated in the internal platform service layer 112. In the example, there are three example client ID values, ID1. ID2 and ID3; two different API ID values, API1 and API2; and two different database entity ID values, Quote, Order and Contact. The first tuple shows that when Client ID1 makes a request on API1, the platform service layer 112 will be granted Create and Read access to the database entity "Quote".

In one implementation, the extended escalation matrix 126B may be stored as a database table for quick retrieval. Storing the extended escalation matrix 126B as a database table which is accessed by the smart escalation service 124, avoids code changes and associated server downtime since access privileges are stored in an updatable file or table rather than being hardcoded in the platform service layer 112.

In further aspect, the extended escalation matrix 126B may be created or updated via a user interface (UI) of an escalation matrix tool, as shown in FIG. 2D.

FIG. 3 illustrates an example UI of an escalation matrix tool 300 displayed by the server cluster 108 for creating and modifying the extended escalation matrix 126B. The escalation matrix tool 300 may be implemented as a webpage provided by the cloud platform 104 and displays UI controls to allow an operator to create or modify the extended escalation matrix 126B. In one implementation, the escalation matrix tool 300 may be accessed by an operator of the cloud platform 104, while in another implementation, the escalation matrix tool 300 may be also accessed by an operator/user of the client 102 using a client device. In a further implementation, the escalation matrix tool 300 may also be used to create or modify the base extended matrix 126A.

The UI controls including any combination of a text boxes, drop-down lists, selection buttons, and the like, may be used to enable the operator to enter or select values for a tuple or record in the extended escalation matrix 126B. As shown, values may be entered/selected for the API ID 218, the database entity ID 220, and the CRUD rights. 22. The value for client ID. 16 (FIG. 2C) can be inferred from the user context. The UI example shows creation of an entry in the extended escalation matrix 126B. The entry is to access the database entity "Quote" via "APP1" with Create and Read access only. This corresponds with the first entry of the example extended escalation matrix 126B shown in FIG. 2C.

After entering values into the escalation matrix tool 300, the operator may select some of the UI controls to save a new tuple/record by clicking a "Save" button, or to update an existing tuple/record by clicking an "Update" button to save the tuple/record in the extended escalation matrix 126B database table. Clicking a "Delete" button deletes the tuple. When a Save of an existing Client ID record is attempted instead of an update, the operation will fail and return an error message that "An existing extended escalation matrix for the API ID and database entity ID cannot be saved, please click Update". For an Update, the corresponding record of client ID will be fetched for the database entity ID and the API ID and the record will be updated.

In a further implementation, the extended escalation matrix tool 300 may further include an option (not shown) to delete an existing base escalation matrix 126A or extended escalation matrix 126B. When the operator elects to delete an existing escalation matrix, the escalation matrix will be fetched using the API ID and the database entity ID and matrix will be deleted. In one implementation, for any API ID and database entity ID combination, there can be only one record in the escalation matrix. However, the same database entity ID can be added for multiple API IDs and the accesses can also be different for the database entity ID based on the internal business logic of the corresponding APIs. For example, API2 shown in FIG. 2C can also have extended escalation matrix entry for the database entity "Quote" but this time with only "Create" access.

The smart privilege escalation service 124 of the disclosed embodiments adheres to the idea of least privilege by serving a request under a context with a minimum level of privileges needed to perform the task, and requires no code redeployment once implemented. The smart privilege escalation 124 enforces a trust factor by provisioning privilege escalation to clients 102, such that the clients 102 are not allowed to edit the escalation matrix 126, though in some implementations few roles in the client organization may be able to view contents of the escalation matrix 126. Also, since the smart privilege escalation service 124 uses exceptions as an event to trigger the privilege escalation, there is no need for service code to implement the privilege escalation. Another advantage is when a new requirement of updating the escalation matrix 126 is received, the extended escalation matrix can be created or updated via a simple user interface (UI), also requiring no code change or server downtime.

At runtime, activation of an exception signaling failure of the requested CRUD operation is detected by the smart escalation service 124, fetching of the escalation matrix comprises the smart escalation service 124 creating a union of the base escalation matrix 126A and the extended escalation matrix 126B to provide a final version of the escalation matrix 126. For example, assume that in FIG. 2B, the base escalation matrix 126A has an entry for API1 for database entity "Account" and that "Read" access is allowed. When an access is received for API, the escalation matrix for API1 is calculated by performing the union of the base escalation matrix 126A and the extended escalation matrix 126B (FIG. 2C). Thereafter, the union will comprise Account(Read), Quote(Create, Read) and Order(Read).

According to a further aspect of the disclosed embodiments, referring again to FIG. 1, the union of the base escalation matrix 126A and the extended escalation matrix 126B may be cached in cache 128 of the cloud platform 104. The cache 128 may be only accessible to internally by the smart escalation service 124 and not to any other service or API in the cloud platform 104. The smart escalation service 124 may access union escalation data from the cache 128 whenever required. As many API requests may be serviced at the same time, the cache 128 may include union escalation data for many clients 102. Thus caching the escalation matrix avoids needing to repeatedly create the union and service many API for different clients at a same time with increased performance. Caching may improve performance while fetching escalation data for an API over fetching from a database. Whenever a new entry is added via the extended escalation matrix tool 300, the union escalation data in the cache 128 for a given client ID is also updated after saving or deleting the entry. During the servicing an API request by the cloud platform 104, the smart escalation service 124 only fetches from the cache 128 the union escalation data identified by the client ID.

Figure 4:
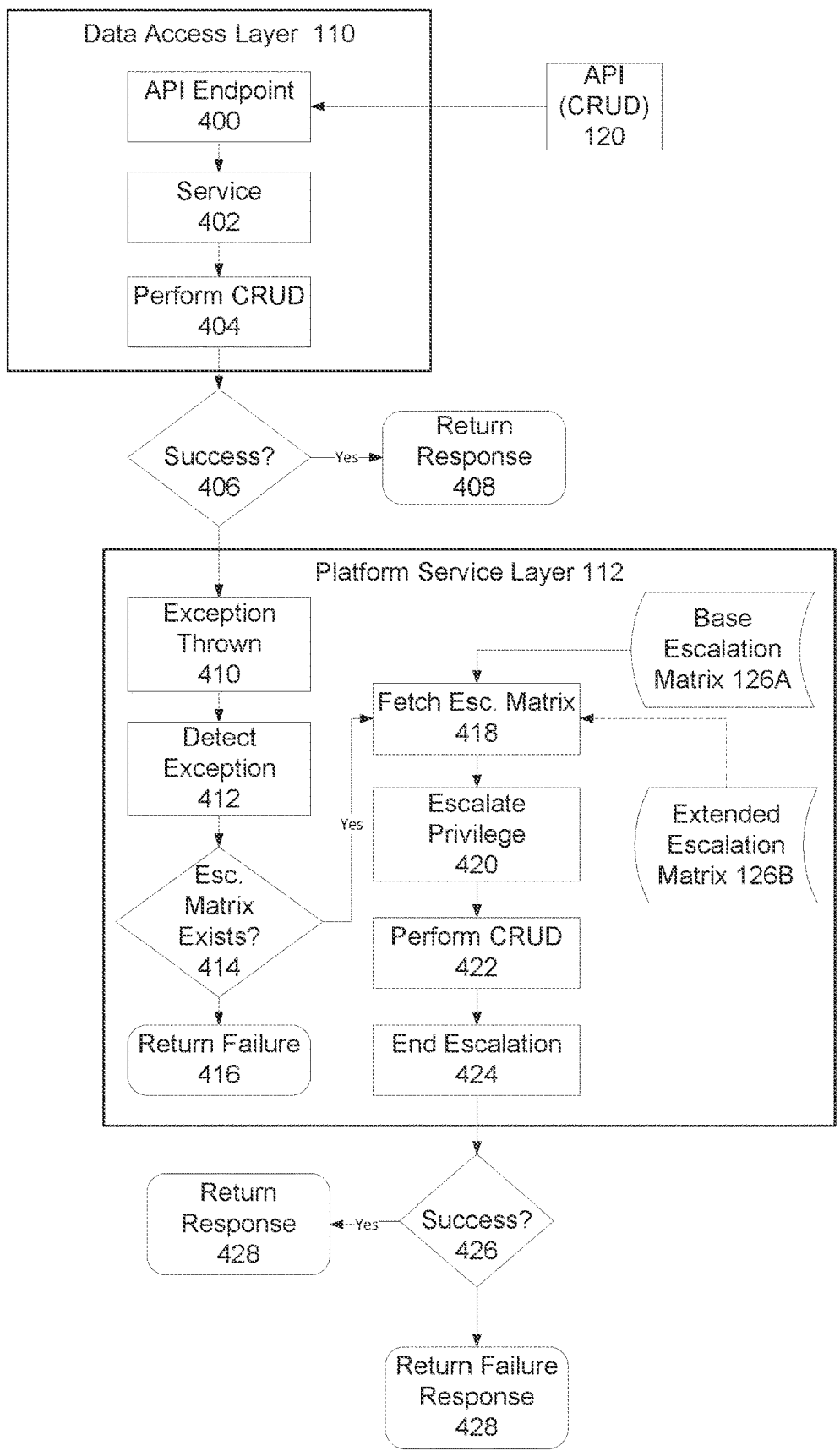
FIG. 4 is a flow diagram showing the smart escalation process in further detail according to one implementation.

FIG. 4 is a flow diagram showing the smart escalation process in further detail according to one implementation. Referring to FIGS. 1 and 4, an API endpoint of the data access layer 110 receives from the server cluster 108 an API query request 120 to perform a CRUD operation (block 400). The API endpoint 400 passes the API query request 120 to a service of the data access layer 110 (block 402), and the service attempts to perform the CRUD operation (block 404). Typically, the service will call the platform service layer 112 to perform the CRUD operation related to a database entity that is accessed internally by the platform service layer 112 or another internal layer of the cloud platform 104.

A check is made to determine if the CRUD operation succeeded (block 406), and if so, a response is returned to the requesting client (block 408). Privilege escalation is not applied for non-failure of a CRUD operation. Also in case of failure of at the first attempt of the CRUD operation, if an escalation matrix for the client does not exist, then the privilege escalation is not performed.

If the CRUD operation fails (block 406), then an exception is thrown in the platform service layer 112 (block 410). According to one aspect of the disclosed embodiments, the smart escalation service 124 uses detection of the exception as an indication that the CRUD operation failed due to inadequate access rights of the clients when attempting to access a database entity internally. The exception is then detected (block 412), and the smart escalation service 124 begins privilege escalation by determining if an escalation matrix for the requesting client exists (block 414). When privilege escalation is being applied after the first failed CRUD operation attempt (block 406), and the CRUD operation again fails (block 414), the failure is not due to privilege escalation and nothing can be done so a failure response is returned to the requesting client (block 416).

If the escalation matrix exists, the smart escalation service 124 fetches the escalation matrix 126, which may include forming a union between the base escalation matrix 126A and the extended escalation matrix 126B if necessary (block 418). The smart escalation service 124 then escalates the privilege by applying the client access privileges from the escalation matrix 126 to a user context of the current API query request (block 420), and repeats the requested CRUD operation via line 136 (block 422). As soon as the CRUD operation is invoked, the privilege escalation is ended (block 424). A second check is made to determine if the CRUD operation succeeded (block 426), and if so, a response is returned to the requesting client (block 428). Otherwise, a failure response is returned to the requesting client (block 428).

Figure 5:
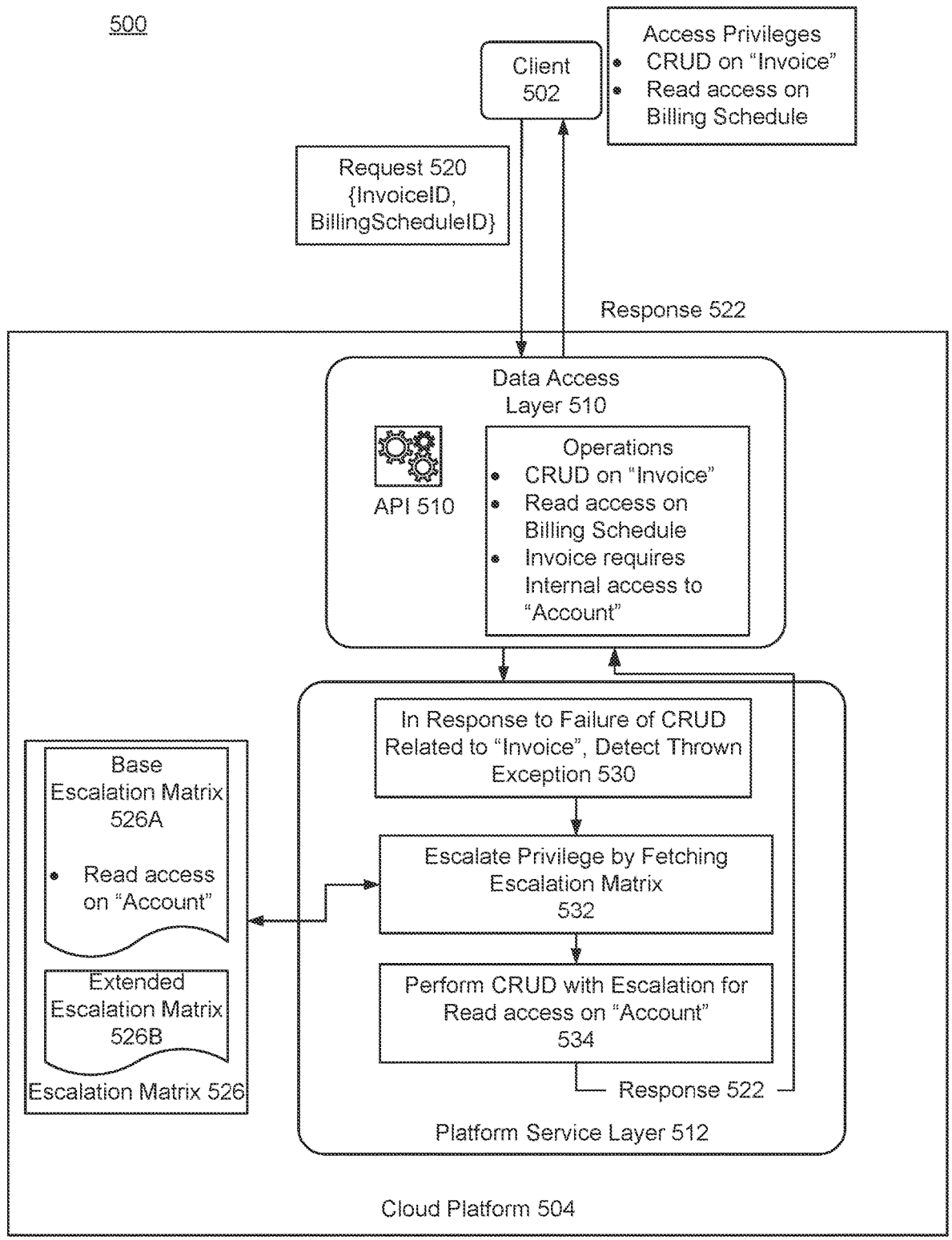
FIG. 5 is a diagram illustrating an example processing flow of the smart escalation service.

FIG. 5 is a diagram illustrating an example processing flow of the smart escalation service. In this example, assume that the cloud platform provider provisioned client 502 via a license with original CRUD access to a database entity1 called "Invoice" and read access to database entity2 called "Billing Schedule", both of which include individual rows of records.

The API 510 is configured to perform record operations on database entities "Invoice" and "Billing Schedule" identified by the InvoiceID and BillingScheduleID present in the API request 520. The API 510 is further configured with the knowledge that database entity "Invoice" has a foreign key field "Account". Meaning in a record of database entity "Invoice", there is a field called "Account", whose type is foreign key, and whose value is an ID of a record in a database entity called "Account". This example ignores any such field in the database entity "Billing Schedule" for simplicity.

Further assume that database entity "Account" is internal to the cloud platform 504 and for which the API 510 does not need client access. Therefore, privilege escalation for "Account" is required, so the cloud platform provisions the base escalation matrix 526A with read access for database entity "Account". Note, there may be various reason the client 502 may not be given access to "Account". For example, the hierarchy of the client organization may not permit API access by a standard user to the database entity "Account".

In operation, the client submits an API request 520, which includes an ID for "Invoice" called InvoiceID, and an ID for "Billing Schedule" ID called BillingScheduleID. Once the data access layer 510 receives the API request 520 through API 510, a service will be called that attempts to perform the CRUD operation on "Invoice" and will fetch the record of Invoice database entity using the invoice ID received in the request. The service passes the whole Invoice record (which also contains the Account ID foreign key field). When the CRUD operation is attempted on the Invoice record, the operation will fail. All the invocations from data access layer 510 through to the internal platform service layer 512 happens in the context of the client 502 or user who calling API 510. The accesses that are required are in the user context. Because the current user does not have access to "Account", which is present in the Invoice record in the foreign key field, the CRUD operation fails and an exception is thrown indicating a required access permission is missing.

This missing access related exception is detected by the smart escalation service running in the internal platform service layer 512 (block 530). The smart escalation service then attempts escalate the privilege by determining if the client 502 to which the current user belongs has any escalation matrix 526 assigned, and if so, fetches the escalation matrix 526 (block 532). In one application, the escalation matrix is assigned at client level not at user level because escalation matrix 526 is valid for any user in the client organization. For fetching the escalation matrix 526, the smart escalation service uses the current API ID or context key because escalation matrix 526 is mapped to the API ID.

In the example, assume the escalation matrix 526 contains an entry for Read access on the database entity "Account". The corresponding base escalation matrix 526A is fetched, and applied to current user context. After doing so the current user will get the proper access (in this case Read) on database entity "Account".

The CRUD operation is retried on the "Invoice" record with escalation for read access on "Account" (block 534), and will succeed and response 522 is returned to the caller. If even after applying escalation matrix 526, the CRUD operation fails, nothing can be done, and a failure response is returned to the caller with proper information.

In one implementation, the requirement of having access on "Account" when a CRUD operation on the "Invoice" record is performed is only applicable when the "Account" foreign key field in "Invoice" is a mandatory field. For a non-mandatory field, no such requirement may be present. So if only non-mandatory fields are present on a record, then the CRUD will succeed even if the current user does not have the access on those non-mandatory fields. However, in another implementation, privilege escalation may be applied to any access that is needed internally irrespective of the presence of mandatory or non-mandatory fields.

According to the disclosed embodiments, to implement the smart escalation service, code implementing the smart escalation service only needs to be added once to the internal platform level code that performs the CRUD operation. After that the code never ever changes for a new privilege requirement. For new requirements, the new privilege can be added to the escalation matrix via the UI (FIG. 2D), which does not require server downtime.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
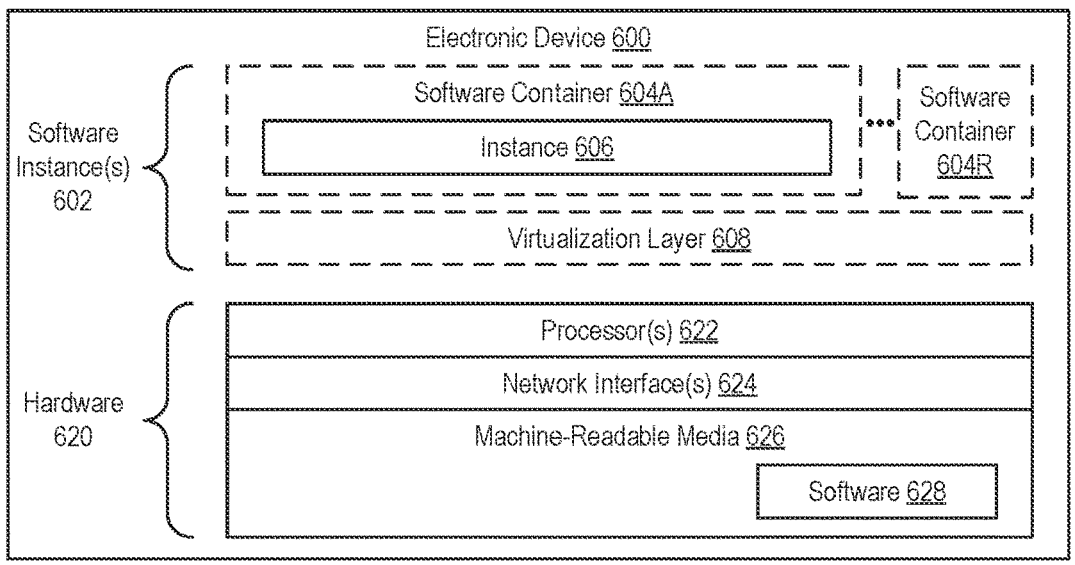
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients and the smart privilege escalation in a cloud platform may be implemented in one or more electronic devices 600. In one implementation. 1) each of the clients is implemented in a separate one of the electronic devices 600 (e.g., in end user devices where the software 628 represents the software to implement clients to interface directly and/or indirectly with the smart privilege escalation in a cloud platform (e.g., software 628 represents a web browser, a native client, a portal, a command-line interface, and/or an application programming interface (API) based upon protocols such as Simple Object Access Protocol (SOAP), Representational State Transfer (REST), etc.)); 2) the smart privilege escalation in a cloud platform is implemented in a separate set of one or more of the electronic devices 600 (e.g., a set of one or more server devices where the software 628 represents the software to implement the smart privilege escalation in a cloud platform); and 3) in operation, the electronic devices implementing the clients and the smart privilege escalation in a cloud platform would be communicatively coupled (e.g., by a network) and would establish between them (or through one or more other layers and/or or other services) connections for submitting configuration data to the smart privilege escalation in a cloud platform and returning a software package to the clients. Other configurations of electronic devices may be used in other implementations (e.g., an implementation in which the client and the smart privilege escalation in a cloud platform are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 606A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 606A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 606A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 606A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 606A-604R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
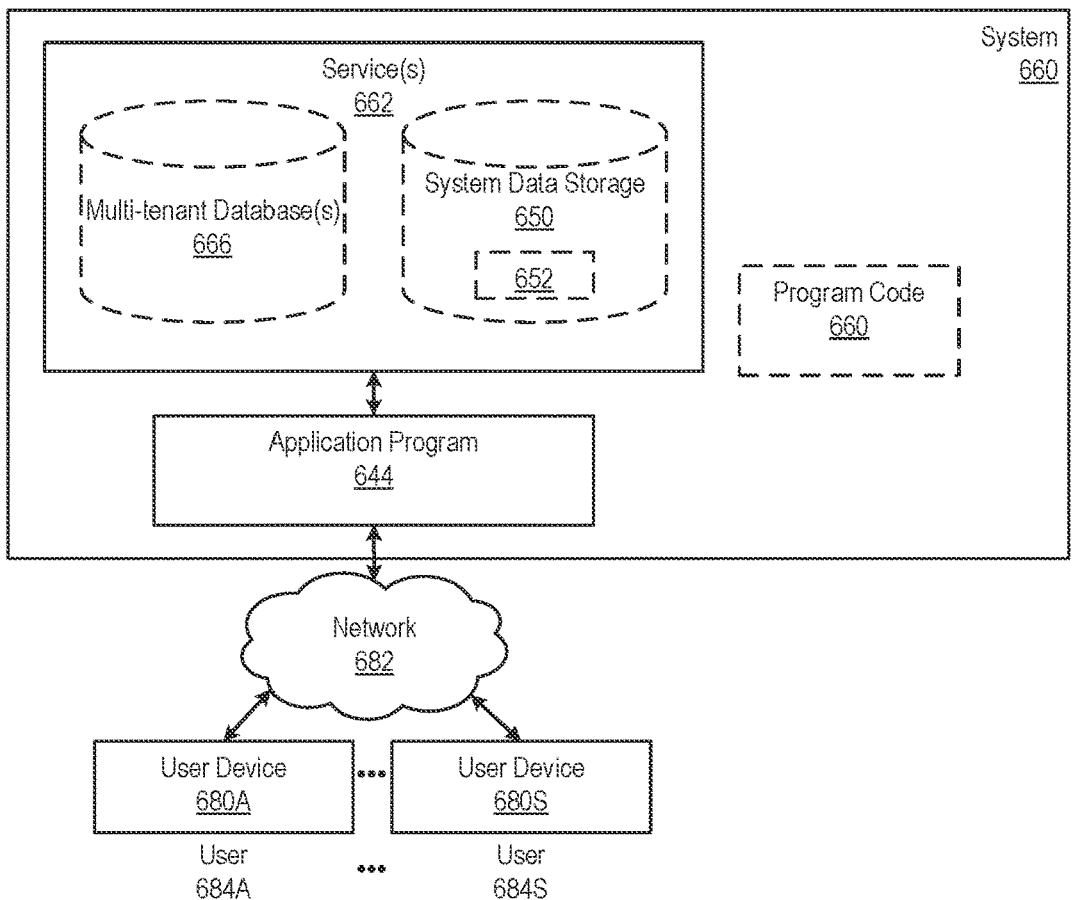
FIG. 6B is a block diagram of a deployment environment according to some example implementations.

FIG. 6B is a block diagram of a deployment environment according to some example implementations. A system 660 includes hardware (e.g., a set of one or more server devices) and software to provide service(s) 662, including the smart privilege escalation in a cloud platform. In some implementations the system 660 is in one or more datacenter(s). These datacenter(s) may be: 1) first party datacenter(s), which are datacenter(s) owned and/or operated by the same entity that provides and/or operates some or all of the software that provides the service(s) 662; and/or 2) third-party datacenter(s), which are datacenter(s) owned and/or operated by one or more different entities than the entity that provides the service(s) 662 (e.g., the different entities may host some or all of the software provided and/or operated by the entity that provides the service(s) 662). For example, third-party datacenters may be owned and/or operated by entities providing public cloud services (e.g., Amazon.com, Inc. (Amazon Web Services), Google LLC (Google Cloud Platform (GCP)), Microsoft Corporation (Azure)).

The system 660 is coupled to user devices 680A-680S over a network 682. The service(s) 662 may be on-demand services that are made available to one or more of the users 686A-684S working for one or more entities other than the entity which owns and/or operates the on-demand services (those users sometimes referred to as outside users) so that those entities need not be concerned with building and/or maintaining a system, but instead may make use of the service(s) 662 when needed (e.g., when needed by the users 686A-684S). The service(s) 662 may communicate with each other and/or with one or more of the user devices 680A-680S via one or more APIs (e.g., a REST API). In some implementations, the user devices 680A-680S are operated by users 686A-684S, and each may be operated as a client device and/or a server device. In some implementations, one or more of the user devices 680A-680S are separate ones of the electronic device 600 or include one or more features of the electronic device 600.

In some implementations, the system 660 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 660 is a multi-tenant cloud computing architecture supporting multiple services, such as one or more of the following types of services: Privilege Escalation; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 660 may include an application platform 644 that enables PAAS for creating, managing, and executing one or more applications developed by the provider of the application platform 644, users accessing the system 660 via one or more of user devices 680A-680S, or third-party application developers accessing the system 660 via one or more of user devices 680A-680S.

In some implementations, one or more of the service(s) 662 may use one or more multi-tenant databases 666, as well as system data storage 650 for system data 652 accessible to system 660. In certain implementations, the system 660 includes a set of one or more servers that are running on server electronic devices and that are configured to handle requests for any authorized user associated with any tenant (there is no server affinity for a user and/or tenant to a specific server). The user devices 680A-680S communicate with the server(s) of system 660 to request and update tenant-level data and system-level data hosted by system 660, and in response the system 660 (e.g., one or more servers in system 660) automatically may generate one or more Structured Query Language (SQL) statements (e.g., one or more SQL queries) that are designed to access the desired information from the multi-tenant database(s) 666 and/or system data storage 650.

In some implementations, the service(s) 662 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants, and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the smart privilege escalation in a cloud platform, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 660 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 660. For example, the user interface device can be used to access data and applications hosted by system 660, and to perform searches on stored data, and otherwise allow one or more of users 686A-684S to interact with various GUI pages that may be presented to the one or more of users 686A-684S. User devices 680A-680S might communicate with system 660 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 660, thus allowing users 686A-684S of the user devices 680A-680S to access, process and view information, pages and applications available to it from system 660 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for privilege escalation in a cloud platform having database entities, the cloud platform exposing one or more application programming interfaces (APIs) as a payload for a client to perform CRUD (Create, Delete, Update Delete) operations on the database entities, the method performed by a server cluster of the cloud platform comprising;
   provisioning to a client access privileges to the database entities that are covered by a license;
   provisioning a base escalation matrix to the client with additional access privileges not covered by the license, and providing the base escalation matrix with one or more entries comprising an API identifier (ID) through which an access request is made, a database entity ID for which access is required, and allowed CRUD operations;
   receiving an API request comprising: a database ID of a first database entity of the database entities, and a requested CRUD operation to be performed on the first database entity;
   attempting to perform the requested CRUD operation on the first database entity;
   responsive to the requested CRUD operation initially failing because the client does not have required access privileges provisioned under the license: detecting activation of an exception signaling failure of the requested CRUD operation, and using the exception as a trigger to fetch the base escalation matrix;
   escalating the access privileges of a user context of the current API query request, by applying the additional access privileges from the base escalation matrix to the requested CRUD operation, and repeating the requested CRUD operation; and
   removing the escalated access privileges.

2. The method of claim 1, further comprising: creating an extended escalation matrix when a change in business logic requires new access privileges subsequent to creation of the base escalation matrix.

3. The method of claim 2, wherein fetching the base escalation matrix further comprises: creating a union of the base escalation matrix and the extended escalation matrix to provide a final escalation matrix.

4. The method of claim 3, further comprising: caching the final escalation matrix to avoid repeatedly creating the union and service many API for different clients at a same time.

5. The method of claim 2, further comprising: displaying, by the server cluster, a user interface (UI) that enables an operator to create or modify the extended escalation matrix.

6. The method of claim 2, further comprising: storing the base escalation matrix as a file and storing the extended escalation matrix as a database table.

7. The method of claim 1, further comprising: creating a single base escalation matrix for all of the one or more APIs that includes a series of records each having the API ID, the database entity ID, the allowed CRUD operations, and a client ID.

8. The method of claim 1, further comprising: creating, controlling, and storing the base escalation matrix and an extended escalation matrix by the cloud platform.

9. The method of claim 1, further comprising: implementing in a service in an internal layer of the cloud platform the detecting of the activation of the exception, the fetching the base escalation matrix, and the escalating the access privileges of the client by applying the additional access privileges from the base escalation matrix to the requested CRUD operation.

10. A non-transitory machine-readable storage medium (NMRSM) of a cloud platform having database entities, the cloud platform exposing one or more application programming interfaces (APIs) as a payload for a client to perform CRUD (Create, Delete, Update Delete) operations on the database entities, the NMRSM provides instructions that, if executed by a server cluster of the cloud platform, are configurable to cause the server cluster to perform operations comprising:
    provisioning to a client access privileges to the database entities that are covered by a license;
    provisioning a base escalation matrix to the client with additional access privileges not covered by the license, and providing the base escalation matrix with one or more entries comprising an API identifier (ID) through which an access request is made, a database entity ID for which access is required, and allowed CRUD operations;
    receiving an API request comprising: a database ID of a first database entity of the database entities, and a requested CRUD operation to be performed on the first database entity;
    attempting to perform the requested CRUD operation on the first database entity;
    responsive to the requested CRUD operation initially failing because the client does not have required access privileges provisioned under the license: detecting activation of an exception signaling failure of the requested CRUD operation, and using the exception as a trigger to fetch the base escalation matrix;
    escalating the access privileges of the client by applying the additional access privileges from the base escalation matrix to a user context of the current API query request, and repeating the requested CRUD operation; and
    removing the escalated access privileges.

11. The NMRSM of claim 10, further comprising instructions for: creating an extended escalation matrix when a change in business logic requires new access privileges subsequent to creation of the base escalation matrix.

12. The NMRSM of claim 11, wherein fetching the base escalation matrix further comprises instructions for: creating a union of the base escalation matrix and the extended escalation matrix to provide a final escalation matrix.

13. The NMRSM of claim 12, further comprising instructions for: caching the final escalation matrix to avoid repeatedly creating the union and service many API for different clients at a same time.

14. The NMRSM of claim 11, further comprising instructions for: displaying, by the server cluster, a user interface (UI) that enables an operator to create or modify, the extended escalation matrix.

15. The NMRSM of claim 11, further comprising instructions for: storing the base escalation matrix as a file and storing the extended escalation matrix as a database table.

16. The NMRSM of claim 10, further comprising instructions for: creating a single base escalation matrix for all of the one or more APIs that includes a series of records each having the API ID, the database entity ID, the allowed CRUD operations, and a client ID.

17. The NMRSM of claim 10, further comprising instructions for: creating, controlling, and storing the base escalation matrix and an extended escalation matrix by the cloud platform.

18. The NMRSM of claim 10, further comprising instructions for: implementing in a service in an internal layer of the cloud platform the detecting of the activation of the exception, the fetching the base escalation matrix, and the escalating the access privileges of the client by applying the additional access privileges from the base escalation matrix to the requested CRUD operation.

19. A cloud platform comprising:
a server cluster;
database entities accessible by the server cluster;
one or more application programming interfaces (APIs) used as a payload for a client to perform CRUD (Create, Delete, Update Delete) operations on the database entities; and
a non-transitory machine-readable storage medium that provides instructions that, if executed by the server cluster, are configurable to cause the cloud platform to perform operations comprising:
provisioning to a client access privileges to the database entities that are covered by a license;
provisioning a base escalation matrix to the client with additional access privileges not covered by the license, and providing the base escalation matrix with one or more entries comprising an API identifier (ID) through which an access request is made, a database entity ID for which access is required, and allowed CRUD operations;
receiving an API request comprising: a database ID of a first database entity of the database entities, and a requested CRUD operation to be performed on the first database entity;
attempting to perform the requested CRUD operation on the first database entity;
responsive to the requested CRUD operation initially failing because the client does not have required access privileges provisioned under the license; detecting activation of an exception signaling failure of the requested CRUD operation, and using the exception as a trigger to fetch the base escalation matrix;
escalating the access privileges of the client by applying the additional access privileges from the base escalation matrix to a user context of the current API query request, and repeating the requested CRUD operation; and
removing the escalated access privileges.

20. The cloud platform of claim 19, further comprising instructions for: creating an extended escalation matrix when a change in business logic requires new access privileges subsequent to creation of the base escalation matrix.

21. The cloud platform of claim 20, wherein fetching the base escalation matrix further comprises instructions for: creating a union of the base escalation matrix and the extended escalation matrix to provide a final escalation matrix.

22. The cloud platform of claim 21, further comprising instructions for: caching the final escalation matrix to avoid repeatedly creating the union and service many API for different clients at a same time.

23. The cloud platform of claim 20, further comprising instructions for: displaying, by the server cluster, a user interface (UI) that enables an operator to create or modify the extended escalation matrix.

24. The cloud platform of claim 20, further comprising instructions for: storing the base escalation matrix as a file and storing the extended escalation matrix as a database table.

25. The cloud platform of claim 19, further comprising instructions for: creating a single base escalation matrix for all of the one or more APIs that includes a series of records each having the API ID, the database entity ID, the allowed CRUD operations, and a client ID.

* * * * *